3,458,350
CHLORINATED POLYETHYLENE COATED FABRICS AND METHOD OF MAKING THE SAME
Oliver A. Barton, Florham Park, and Carl R. Eckardt, Morris Plains, N.J., assignors to Allied Chemical Corporation, New York, N.Y., a corporation of New York
No Drawing. Filed Aug. 17, 1964, Ser. No. 390,201
Int. Cl. C09d 3/64; B44d 1/22
U.S. Cl. 117—161      4 Claims

ABSTRACT OF THE DISCLOSURE

This specification discloses a fabric coating comprising a vulcanizate of (1) a noncrystalline, soluble chlorinated linear polymer of ethylene containing 30–45 percent by weight of chlorine and having a glass transition temperature between −22° C. and 1° C., (2) a pigment, and (3) a peroxide curing agent.

---

Neoprene and butyl rubbers are currently widely used coating materials for nylon fabrics, however, they are costly and it is difficult to obtain white and light pastel colored fabrics with vulcanized neoprene and butyl rubber compositions. Plasticized vinyl compositions for coating nylon fabrics have been suggested and although they are less costly than the neoprene and butyl rubbers, they are not as satisfactory because a good coating for nylon requires in combination a multitude of specific properties including high flexibility at low temperatures, high tensile strength, resistance to impact and tear, chemical inertness, durability, flame resistance, oxidation resistance, ease of fabrication, and firm bonding of the coating to the fabric. Such desired combination of properties has made it particularly difficult to obtain from the plasticized vinyl compositions, a material suitable as coating for nylon fabrics. In addition, it is difficult to obtain satisfactory permanent white and light colored pastel coated nylon fabrics with the plasticized vinyl compositions, and moreover, the plasticized vinyl coatings have the disadvantage of migratory plasticizers which are removable by solvents, e.g., chlorinated hydrocarbons or solvent naphthas used in dry cleaning.

An object of the invention is to provide a superior coating for nylon fabrics based on chlorinated polyethylene.

Another object is to provide a cured coated nylon fabric possessing the required combination of properties for producing sheeted articles for protective and inflatable end products.

Another object is to provide white and light pastel-colored coated nylon fabrics.

Other objects and advantages will be apparent from the following detailed description.

In accordance with the present invention, it has been found that an especially good coating for nylon fabric is provided by applying to the fabric and curing a composition comprising (a) 100 parts of a chlorinated linear polymer of ethylene of 30 to 45% chlorine by weight, less than 1% crystallinity as determined by differential thermal analysis and a glass transition temperature ranging from −22° C. for the 30% chlorine content chlorinated polyethylene up to about +1° C. for the 45% chlorine content, said chlorinated linear polymer of ethylene being soluble in aromatic hydrocarbon solvents; (b) between about 1 to 30 parts pigment filler; and (c) about 3 to 6 parts of a peroxide curing agent for said chlorinated polyethylene.

The polyethylene chlorinated to produce the chlorinated polyethylene employed in the invention is a linear, high density polymer of ethylene having a melting point (i.e., temperature at which the fusion of the crystalline regions is completed) in the range between about 125° C. and about 145° C. and intrinsic viscosity in Decalin at 135° C. in the range from about .7 to about 3.5 dl./gm. Melting point of the polyethylene can be determined by various known methods such as disappearance of double refraction, differential thermal analysis, etc. The polymers often show a melting range of say 5–10° C. by these methods. The melting point herein referred to is the upper limit of the melting range. Intrinsic viscosity is determined by standard methods involving extrapolation of reduced viscosity to infinite dilution, a suitable procedure being as described in ASTM Test D1601–61.

The chlorinated polyethylenes employed in the invention have high tensile strength of at least 1000 p.s.i., and have exceptional flexibility and extensibility for given chlorine content at temperatures of −25° C. and below. They are soluble to the extent of at least 95% in benzene and toluene and have intrinsic viscosity in ortho-dichlorobenzene at 100° C. in the range of about .5 to 3.0 dl./gm. Solubilities of the chlorinated polyethylenes are somewhat dependent on temperature and chlorine content. At about 30% by weight chlorine and above, the chlorinated polyethylenes are fully soluble even at 25° C. in benzene and toluene to at least 20% by weight solids concentration. Another characteristic of the chlorinated polyethylenes is that they have glass transition temperatures ranging from at least about −22° C. for 30% chlorine content material up to at least about +1° C. for the 45% chlorine content. The glass transition temperature characteristics of other chlorine content polymers within the 30 to 45% chlorine range may be readily plotted from the values given above. Glass transition temperatures referred to herein represent the temperature at which a standard torsional stiffness of the sample is reached. They are determined by use of torsional wire apparatus as described in ASTM Test D1053–61, using methanol as cooling liquid. The glass transition temperature is taken as that temperature at which the torsional modulus of rigidity determined by this ASTM Test has the value $1.45 \times 10^4$ p.s.i.

Another structural characteristic of the chlorinated polyethylenes contributing to their low Tg's and their solubilities is the distribution of the chloro-substituents along each molecular chain. It appears the distribution deviates from random in the chlorinated polyethylene in favor of short groups of say 2 to 10 neighboring carbon atoms each substituted by one chlorine atom.

A particularly effective chlorinated polyethylene useful in the preparation of the coating compositions of the present invention is one having about 40±1% by weight chlorine, substantially 0% crystallinity as determined by differential thermal analysis, a glass transition temperature of about −14° C. and molecular weight corresponding to an intrinsic viscosity of about 1.4 in o-dichlorobenzene at 100° C.

The chlorinated polyethylenes employed in the coating compositions of the present invention are desirably prepared for use as described in co-pending application of Carl R. Eckardt and William M. Bungo, Ser. No. 354,345, filed Mar. 24, 1964. The process involves a final "tipping" of a chlorinated ethylene polymer with from 1% to 15% of chlorine by weight of the final product, in aqueous slurry at a temperature above the polyethylene melting point. The chlorinated polymer thus reacted or "tipped" with chlorine must be produced under controlled conditions of slurry density, chlorination rate and temperature; and must be produced from a starting polyethylene with melting point in the range between about 125° C. and about 145° C. and intrinsic viscosity in Decalin at 135° C. in the range of from about .7 to 3.5 dl./gm. In a preferred technique, the polyethylene in the form of small particles all passing through about 20 mesh is slurried in water at solids concentration in the slurry not above 20% by weight and preferably about 5–10% by weight. Chlorine is fed to the aqueous slurry at a rate not above five pounds of chlorine per pound of polyethylene. The feed rate of the chlorine is limited, however, until the polyethylene reaches at least about 3% chlorine content so as to maintain the chlorine partial pressure in the gas phase not above one atmosphere absolute. The bulk of the chlorination must be carried out at temperatures which do not exceed about 120° C. but which reach at least 100° C. Suitably, the temperatures employed for the bulk of the chlorination are at least 5° C. below the melting range of the polyethylene being chlorinated.

When the chlorine content of the chlorinated polymer in the aqueous slurry has reached a level not more than 15% by weight from the desired final chlorine content and at least 1% by weight from this final chlorine content, the critical step of tipping with chlorine at elevated temperature above the polyethylene melting point is performed. The temperature of the slurry is brought to and completely through the melting range of the polyethylene starting material, and is brought usually within about 5° C. above the upper limit of the melting range of polyethylene starting material but not above 145° C. The chlorination is then conducted in this elevated temperature range to obtain the desired tipping with 1–15% of combined chlorine.

Within the cited range of 1–15% for amount of chlorine used to tip the product at elevated temperature, the amount of chlorine giving best results has been found to depend upon the intrinsic viscosity of the polyethylene starting material and on the weight percent chlorine desired in the final product, in such manner that products with about 35–40% final chlorine content should be tipped with the largest amount of chlorine. Specifically, when the polyethylene intrinsic viscosities are in the lower part of the permissible range, from about .7 to 1.7 dl./gm. and when the final product contains 30 to 40% by weight chlorine, the amount of chlorine used for tipping should increase with increasing final chlorine content and should preferably increase from about 3% for 30% chlorine to about 5% for 40% chlorine, by weight of the final product.

In practice of the invention, a coating dispersion may be prepared by first compounding the components by conventional compounding procedures, for example, by mixing of the components together in a Banbury mixer or two roll rubber mill. This treatment is necessary because if the chlorinated polyethylene and other ingredients are not milled or "sheared," the viscosities of the final dispersion are about 100,000 centipoises at total solids content of about 20% to 30%. Such high viscosities are not adaptable to commercial coating practices. By milling the chlorinated polyethylene, there is subsequently obtained a solution viscosity which after the addition of the other ingredients results in a finished solution of the compounded stock within a range of 40,000 to 80,000 centipoises which are suitable for fabric coating. Compounding temperatures are preferably of the order of about 40 to 90° C.

After the initial mixing of the chlorinated polyethylene, the remainder of the ingredients may be added to the fused stock. In order to impart color to the coating, a color pigment is added to the composition. This pigment loading or filler provides a coated fabric with varying degrees of flexibility, hardness, drape, weatherability, non-flammability, and abrasion resistance. Conventional pigments may be employed with chlorine containing polymers, examples of which include titanium oxide, magnesium oxide, phthalocyanine green or blue and carbon black. The usual amount of such pigments are effective, for example, between about 1 to 50 parts of pigment preferably 5 to 30 parts per 100 parts of the chlorinated polyethylene. A particular advantage of the coating composition of the present invention is the ability to produce white and light colored pastel coated nylon fabrics. Titanium dioxide such as pigment grade rutile type "Titanox RA–NC" could be incorporated in the composition in amounts ranging from about 5 to 30 parts pigment per 100 parts of chlorinated polyethylene to produce a highly acceptable white coated fabric.

To protect the chlorinated polyethylene against heat decomposition a heat stabilizer may be added to the composition. Conventional heat stabilizers may be employed with chlorine containing polymer, examples of which include "Epon 828" a bisphenol A epoxy resin and a product of Shell Chemical Company; "Polyguard" an alkylated aryl phosphite and a product of Naugatuck Chemical Company and "CS–137" a barium sodium salt and a product of the National Lead Company. The usual amount of such stabilizers are effective, i.e., between about 2 to 10 parts of stabilizer per 100 parts of chlorinated polyethylene. Lubricants may also be added to the composition. Such lubricants are well-known materials and are usually employed in amounts between about ½ to 2 parts per 100 parts of the chlorinated polyethylene. Examples of such lubricants include: stearic acid, stearamide, oleamides, cadmium stearate and calcium stearate.

The stearic acid when used in smaller amounts acts as an effective lubricant in the milling of the compound. When used in larger amounts, it is particularly effective as an anti-blocking agent in the finished product. Use of other anti-blocking materials such as fatty acid amides and esters (stearates, stearamides, oleamides, etc.) may also be employed.

After the above ingredients have been compounded, the coating dispersion is prepared by charging the compounded stock into a suitable apparatus containing an organic solvent such as toluene, benzene, or xylene. The temperature during the addition of the compounded stock is desirably within a range of 40 to 50° C. and the addition of the ingredient is usually accompanied by slight agitation of the medium in order to obtain proper dispersion. Thereafter, the temperature is elevated to within a range of 70 to 80° C. and agitation continued until there is obtained a homogeneous dispersion of the mixture measuring about 40,000 to 80,000 centipoises as measured with a Brookfield rotating spindle viscometer.

In a separate procedure, a curing agent is added to an organic solvent such as benzene, xylene, or toluene at a temperature of about 25 to 35° C. and allowed to cool to room temperature.

The toluene dispersion of the compounded stock and the solution containing the curing agent are then mixed together and applied to the fabric in a conventional manner. The curing of the chlorinated linear polyethylene is effected by the employment of peroxide curing agents. Examples of such peroxide curing agents include: benzoyl peroxide, caprylyl peroxide, lauroyl peroxide, dicumyl peroxide, and t-butylhydro peroxide. The more preferred peroxide curing agents are: benzoyl peroxide and dicumyl peroxide. The amount of peroxide curing agent employed is generally between about 3 to 6 parts per 100 parts of the chlorinated polyethylene, more usually about 4 parts. Curing temperatures may be on the order of 80 to 150° C., preferably between 100° C. and 130° C. The appropriate curing temperature and time for curing is dependent in part upon the temperature at which the particular peroxide employed decomposes and the rate of decomposition. Merely as illustrative, when benzoyl peroxide was employed as the curing agent in an amount of about four parts per 100 of chlorinated polyethylene, an effective cure was obtained by heating the coated fabric for an hour at 100° C. or 0.5 hour at 130° C. as evidenced by substantial insolubilization of the product in o-dichlorobenzene at 100° C., usually about 80 to 95% insoluble.

The gel or degree of vulcanization may be determined by placing a small sample of the vulcanized material in a stainless steel screen cage within a "Soxhlet" extractor.

The sample is then extracted with o-dichlorobenzene for a short period of time, usually about six hours, at temperatures of about 90–100° C. and thereafter oven dried for about 10 to 15 hours at 100° C. at 1 to 2 mm. pressure. Gel or degree of vulcanization may then be determined by the difference in weight between the original and dried extracted samples and is expressed in terms of percentage of vulcanization.

In general, however, high temperatures above about 140° C. are to be avoided in curing since they may cause discoloration, shrinking of the fabric being coated and blistering due to traces of solvent retained during drying steps. The peroxide curing agents may be employed in combination with a curing accelerator which include: magnesium oxide, sulfur, "Tetrone A" dipentamethylenethiuram a product of Du Pont and "Thiurad" tetramethylthiuram disulfide a product of Monsanto. Generally, such accelerators are employed in amount of about .5 to 2 parts per 100 parts of chlorinated polyethylene, more usually in an amount between .5 to 1.5 parts.

The following examples in which parts and percentages are by weight demonstrate the practice and advantages of the present invention.

EXAMPLE 1

(A) Preparation of 40% chlorinated polyethylene

A chlorinated polyethylene containing 40% chlorine by weight was prepared from a polyrated polyethylene of intrinsic viscosity of about 1.95 dl./gm. in Decalin at 135° C., density of 0.94 gm./ml., a melt index of about 0.2 gram per 10 minutes, and average molecular weight of 130,000 to 170,000. The method of preparation was as described in the co-pending application of Carl R. Eckhardt and William M. Bungo, Ser. No. 354,345, filed Mar. 24, 1964, now abandoned, particularly Example 2. Chlorination was initiated at 100° C. at a rate of 0.2 pound of chlorine per pound of polyethylene per hour. Temperature of the reaction mixture was then increased (with continued chlorination at the 0.2 rate) to 115° C. at which temperature 10% by weight of chlorine had been introduced into the polymer. Chlorination was continued at 115° C. until chlorine content of the polymer was 34%, then the temperature was increased to 140° C. during which period the chlorination continued and the chlorine content of the polymer reached 36%. The product was then tipped with chlorine at 140° C., until the product contained 40% chlorine by weight. The chlorination rate of 0.2 pound of chlorine per pound of polyethylene per hour was maintained throughout. The recovered product had an intrinsic viscosity of 1.4 as measured in o-dichlorobenzene at 100° C., a glass transition temperature of −14° C. according to ASTM Test D1053–61 and substantially zero crystallinity.

(B) Preparation of coating dispersion

A hundred parts of the chlorinated polyethylene prepared in (A) above was compounded on a standard two roll rubber mill using the following procedure. The chlorinated polyethylene was first mixed on the mill at about 80 to 90° C. until fused, the stock being cut about six times and end passed about six times. Thereafter, the following ingredients were added to the fused stock on the mill in the sequence listed below:

| Ingredient: | Parts by weight |
|---|---|
| Titanium dioxide (Titanox grade RA–NC) | 30 |
| Antimony oxide (Sb$_2$O$_3$) | 15 |
| Stearic acid | 1 |
| Magnesium oxide (MgO) | 2 |

After each addition, the stock was cut from the mill, folded, "end passed" through the mill about six times to insure good mixing and uniform distribution of the components in the stock. The strips of compounded stock were charged into a vessel containing 1900 grams of toluene heated at 45° C. with moderate stirring, the addition of the strips being at such a rate that the added strips were substantially dispersed or swollen in the toluene before adding more strips. After all of the stock was added to the toluene, the temperature of the mixture was brought to 70–80° C. and stirring continued for about two hours when a homogeneous dispersion was obtained. This was poured from the vessel while hot into a suitable container and allowed to cool. Viscosity of this solution was on the order of 80,000 centipoises as measured with a Brookfield rotating spindle viscometer.

In a separate procedure four parts by weight on a compound basis of 100% benzoyl peroxide was dissolved in 435 grams of toluene at about 30° C. with stirring, the resultant solution poured into a suitable container and allowed to cool to room temperature. The toluene dispersion of the compounded stock and the toluene solution of the benzyl peroxide were stirred together to give a coating dispersion containing 28% solids and 18.6% chlorinated polyethylene. The two solutions were mixed shortly before use, since reaction will take place even at room temperature. The mixture is usually stable to up to about six hours. The resultant dispersion had a suitable viscosity for spreading onto fabric having a value of 39,000 centipoises at room temperature.

(C) Coating of the fabric

The coating dispersion of (B) above was applied onto a 2.8 oz./sq. yd. greige nylon fabric, having a relatively open weave, by spreading films of the dispersion on the fabric with a doctor blade applicator. Six coats were applied to each side of the fabric with drying with hot air at 100 to 125° C. for about one to two minutes between coats to remove the toluene. The drying was done with a hot air blower passed over the coated fabric with the blower about four to five inches from the fabric so as to eliminate surface blistering. The coated fabric thus obtained was then cured by heating in a hot air oven for one-half hour at 100° C. to produce a vulcanized dry white-coated fabric of 4.4 oz./sq. yd. An adhesion of coating to fabric having a value of 4.3 lbs./in./side was obtained according to Federal Specification for "Textile Test Methods" CCC–T–191b at two inches per minute head speed. The vulcanized coated fabric was then subjected to various dry cleaning solvents to determine the resistance of the coated fabrics to organic solvents. The coated fabric was evaluated according to Federal Specification CCC–T–191b, Method 5509. Upon analysis, the coated fabric was found to be unaffected by the solvent treatment.

Example 2

Nylon coated specimens were prepared according to the procedure of Example 1 containing various concentrations of ingredients as indicated below. The specimens were evaluated as to the degree of vulcanization (percent gel) and the percent yellowing. The percent yellowing may also be considered as the relative off-whiteness in percent. Whiteness was determined by a Photovolt Reflectometer, the lower values indicating a higher degree of whiteness. The percent gel was determined by insolubility in o-dichlorobenzene. The results are summarized below in table.

TABLE

| Ingredients | Parts by weight | | | | | |
|---|---|---|---|---|---|---|
| | (a) | (b) | (c) | (d) | (e) | (f) |
| 40±1% chlorinated polyethylene | 100 | 100 | 100 | 100 | 100 | 100 |
| Benzoyl peroxide | 4 | 4 | 4 | 4 | 4 | 4 |
| MgO | | 2 | 2 | 2 | 2 | 2 |
| TiO$_2$ | | | 2 | 5 | 10 | 30 |
| Percent gel | 62 | 75 | 82 | 86 | 85 | 87 |
| Percent yellowing | 100 | 61 | 24 | 14 | 7 | 6 |

The coating composition of the present invention may also be applied to other textile materials such as cotton rayon and wool to produce coated textile materials having superior qualities over conventional coated fabrics.

Although certain preferred embodiments of the invention have been disclosed for purpose of illustration, it will be evident that various changes and modifications may be made therein without departing from the scope and spirit of the invention.

We claim:

1. The method of coating fabric comprising applying to the fabric and vulcanizing on the fabric a composition consisting essentially of (a) 100 parts by weight of a chlorinated linear polymer of ethylene of 30 to 45% chlorine by weight, less than 1% crystallinity as determined by differential thermal analysis and a glass transition temperature ranging from −22° C. for the 30% chlorine content chlorinated polyethylene up to about +1° C. for the 45% chlorine content, said chlorinated linear polymer of ethylene being substantially fully soluble in aromatic hydrocarbon solvents, (b) between about 1 to 30 parts by weight pigment filler; and (c) about 3 to 6 parts by weight of peroxide curing agent.

2. The method of coating fabric comprising applying to the fabric and vulcanizing on the fabric a composition consisting essentially of (a) 100 parts by weight of a chlorinated linear polymer of ethylene having 40±1% chlorine by weight, substantially zero crystallinity as measured by differential thermal analysis, a glass transition temperature of −14° C. and molecular weight corresponding to intrinsic viscosity of about 1.4 in o-dichlorobenzene at 100° C.; (b) between about 1 to 30 parts by weight pigment filler; and (c) about 3 to 6 parts by weight of a peroxide curing agent.

3. A fabric coated with the vulcanizate of a composition consisting essentially of (a) 100 parts by weight of a chlorinated linear polymer of ethylene of 30 to 45% chlorine by weight, less than 1% crystallinity as determined by differential thermal analysis and a glass transition temperature ranging from −22° C. for the 30% chlorine content chlorinated polyethylene up to about +1° C. for the 45% chlorine content, said chlorinated linear polymer of ethylene being substantially fully soluble in aromatic hydrocarbon solvents, (b) between about 1 to 30 parts by weight filler; and (c) about 3 to 6 parts by weight of a peroxide curing agent.

4. A fabric coated with the vulcanizate of a composition consisting essentially of (a) 100 parts by weight of a chlorinated linear polymer of ethylene having 40±1% chlorine by weight, substantially zero crystallinity as measured by a differential thermal analysis, a glass transition temperature of −14° C. and molecular weight corresponding to intrinsic viscosity of about 1.4 in o-dichlorobenzene at 100° C.; (b) between about 1 to 30 parts by weight pigment filler; and (c) between about 3 to 6 parts by weight of a peroxide curing agent for said chlorinated polyethylene.

References Cited

UNITED STATES PATENTS

| | | | |
|---|---|---|---|
| 2,630,398 | 3/1953 | Brooks et al. | 117—161 X |
| 3,044,899 | 7/1962 | Canterino | 117—161 X |
| 3,104,985 | 9/1963 | Williams et al. | 117—138.8 X |

WILLIAM D. MARTIN, Primary Examiner

U.S. Cl. X.R.

117—138.8, 141, 143, 145